(12) United States Patent
Nishino

(10) Patent No.: US 6,223,112 B1
(45) Date of Patent: *Apr. 24, 2001

(54) SHIFT DEVICE FOR AN AUTOMATIC TRANSMISSION

(75) Inventor: Kenji Nishino, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/288,611

(22) Filed: Apr. 9, 1999

(30) Foreign Application Priority Data

Apr. 9, 1998 (JP) .................................................. 10-097716

(51) Int. Cl.$^7$ .......................... G06F 17/00; G06F 19/00; B60K 20/00; G05G 11/00
(52) U.S. Cl. .......................... 701/55; 701/52; 74/473.18; 74/484 R; 477/125; 477/906
(58) Field of Search .................................. 701/51, 52, 55, 701/56; 74/473.18, 473.2, 473.24, 473.3, 483 R, 483 PB, 473.1, 473.21; 477/906, 125

(56) References Cited

U.S. PATENT DOCUMENTS

| | | | |
|---|---|---|---|
| 4,987,792 | 1/1991 | Mueller et al. ........................ | 74/473 |
| 5,425,686 | 6/1995 | Grange ................................... | 477/79 |
| 5,520,066 | 5/1996 | Tueri ..................................... | 74/484 |
| 5,680,307 | * 10/1997 | Issa et al. .............................. | 701/52 |
| 5,938,711 | * 4/1999 | Steeby et al. ......................... | 701/52 |
| 6,053,066 | * 4/2000 | Ishii et al. ............................. | 74/473.18 |

FOREIGN PATENT DOCUMENTS 6320975  11/1994 (JP) .

* cited by examiner

Primary Examiner—Jacques H. Louis-Jacques
Assistant Examiner—Brian J Broadhead
(74) Attorney, Agent, or Firm—Foley & Lardner

(57) ABSTRACT

A shift device for an automatic transmission generates no manual shift demand in response to a plurality of operator shift demands. A steering wheel has an up-down select switch. A range selector has an upshift switch and a downshift switch in addition to an automatic mode switch. An operator shift demand may be generated through any one of the steering mounted switches and the select lever. A control unit has an operator upshift demand input terminal and an operator downshift demand input terminal. The control unit has a circuit that generates a two-level up signal and a circuit that generates a two-level down signal. The up signal has an "OFF" level indicative of absence of an operator upshift demand on the operator upshift demand input terminal. It has an "ON" level indicative of presence of an operator upshift demand on the operator upshift demand input terminal. The down signal has an "OFF" level indicative of absence of an operator downshift demand on the operator downshift demand terminal. It has an "ON" level indicative of presence of an operator downshift demand on the operator downshift demand input terminal. The control unit has software, which generates an upshift demand upon a rise in level of the up signal to "ON" level if the down signal is at "OFF" level. This software enables the control unit to generate a downshift demand upon a rise in level of the down signal to "ON" level if the up signal is at "OFF" level.

10 Claims, 10 Drawing Sheets

SHIFT DEVICE FOR AN AUTOMATIC TRANSMISSION

FIELD OF THE INVENTION

The present invention relates to a shift device for an automatic transmission, which is operable in a manual ratio change mode, of a vehicle. More particularly, it relates to a shift device, which enables the vehicle operator to manually control a shift in the automatic transmission.

BACKGROUND OF THE INVENTION

U.S. Pat. No. 4,987,792 discloses a shift device for an automatic transmission operable in a manual ratio change mode. The shift device has a select lever, which may be manipulated for manually controlling a shift after conditioning the automatic transmission for operation in manual ratio change mode. An operator manipulates the select lever to indicate an operator up or downshift demand. The operator shift demand is applied to a transmission control unit. In response to the operator shift demand, the transmission control unit generates a shift demand. This shift demand is applied to a ratio control actuator. The ratio control actuator is activated in response to the shift demand and makes a ratio change.

U.S. Pat. No. 5,520,066 discloses a shift device in the form of a manually operable up-down select switch mounted to a steering wheel. An operator manipulates the up-down select switch to indicate an operator shift demand. The operator shift demand is applied to a transmission control unit. In response to the operator shift demand, the transmission control unit generates a shift demand. The shift demand is applied to a ratio control actuator. The ratio control actuator is activated in response to the shift demand and makes a ratio change.

The prior art devices are fairly well developed. However, a need remains for further development of such devices in light of current movement to a shift device that increases user satisfaction.

SUMMARY OF THE INVENTION

As far as known to the inventor, a shift device meets this need, which can indicate an operator shift demand through a select lever of a range selector or a manual up-down select switch. In this shift device, no shift demand should be generated in response to a plurality of operator shift demands through concurrent manipulation of an up-down select switch and a select lever. In other words, a plurality of operator shift demands should be regarded invalid.

Accordingly, the present invention aims at providing one approach to accomplish this task.

According to the present invention, there is provided a shift device for an automatic transmission, which is operable in a manual ratio change mode, of a vehicle, comprising:

a range selector having a select lever manually operable for selection between the automatic ratio change mode and the manual ratio change mode and for selection between an upshift and a downshift in the manual ratio change mode;

an upshift switch and a downshift switch, which are mounted to said range selector, said upshift switch being operative, in response to selection of the upshift by said select lever, to indicate an operator upshift demand, said downshift switch being operative, in response to selection of the downshift by said select lever, to indicate an operator downshift demand;

an up-down select switch manually operable to select an upshift and a downshift, said up-down select switch being operative, in response to selection of the upshift by manual operation of said up-down select switch, to indicate an operator upshift demand, said up-down select switch being operative, in response to selection of the downshift by manual operation of said up-down select switch, to indicate an operator downshift demand, a control unit having an operator upshift demand input terminal and an operator downshift demand input terminal, said operator upshift demand input terminal being connected to said upshift switch and said up-down select switch, in parallel, said operator downshift demand input terminal being connected to said downshift switch and said up-down select switch, in parallel, said control unit being operative to generate a two-level up signal, said two-level up signal having a first level indicative of absence of an operator upshift demand on said operator upshift demand input terminal and a second level indicative of presence of an operator upshift demand on said operator upshift demand input terminal, said control unit being operative to generate a two-level down signal, said two-level down signal having a first level in indicative of absence of an operator downshift demand on said operator downshift demand input terminal and a second level indicative of presence of an operator downshift demand on said operator downshift demand input terminal, said control unit including a software to generate an upshift demand in response to a change in said two-level up signal from the first level thereof to the second level thereof when said two-level down signal is at the first level thereof and to generate a downshift demand in response to a change in said two-level down signal from the first level thereof to the second level thereof when said two-level up signal is at the first level thereof.

DESCRIPTION OF THE PREFERRED EMBODIMENTS

The accompanying drawings illustrate preferred implementations according to the present invention.

Figure 1:
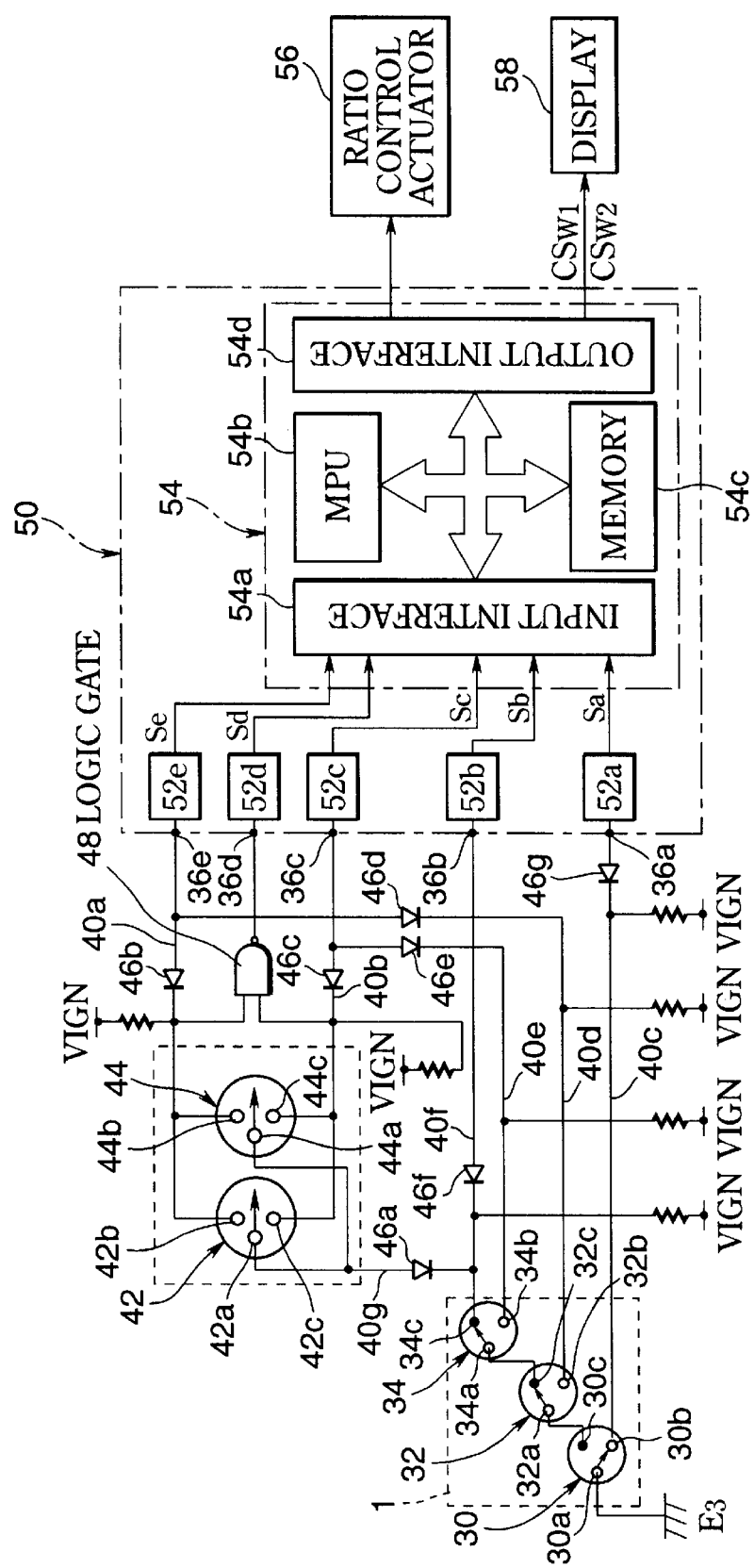
FIG. 1 is a circuit diagram illustrating the relationship between switches, a control unit, a ratio control actuator and a display of the shift device.
Figure 2:
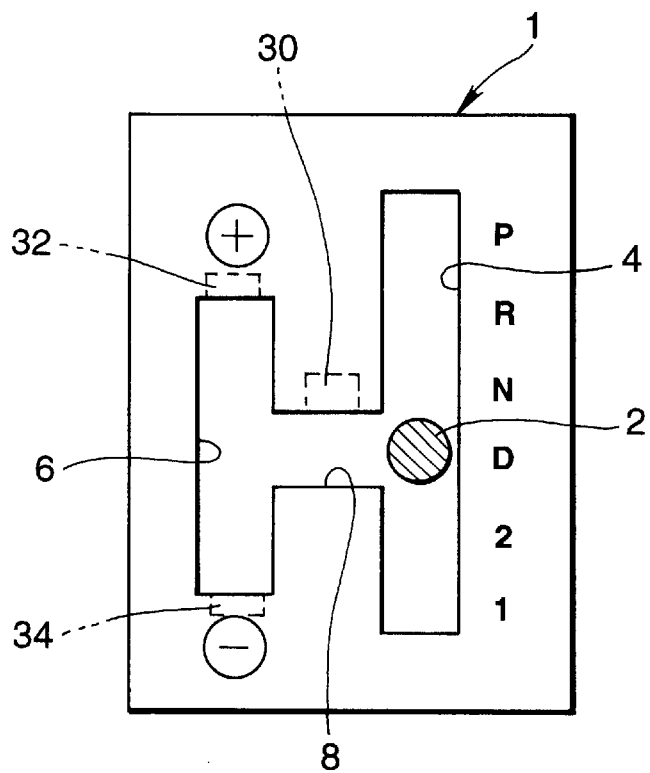
FIG. 2 is a schematic plan view of a range selector with a select lever in section.

FIG. 1 is a circuit diagram illustrating the first preferred implementation of the present invention. In FIG. 1, the reference numeral 1 designates a range selector that is schematically illustrated in FIG. 2. An operator uses the range selector 1 for selection between an automatic ratio change mode and a manual ratio change mode.

Referring to FIG. 2, the range selector 1 has a manual select lever 2. The operator may manually operate the select lever 2 for selection between the automatic ratio change mode and the manual ratio change mode and for selection between an upshift "+" and a downshift "−" in the manual ratio change mode. The select lever 2 extends through an opening into a vehicle cabin. The opening includes a first elongate portion serving as an automatic shift path 4 along which the manual select lever 2 moves when it is manually operated to select one of transmission range positions "P" (Park), "R" (Reverse), "N" (Neutral), "D" (Drive), "2" (Second) and "1" (First). In this example, the automatic shift path 4 extends along a longitudinal centerline of the vehicle cabin. The opening also includes a second relatively short elongate portion serving as a manual shift path 6. The manual shift path 6 extends in parallel to the automatic shift path 4. The opening further includes a third portion serving as a communication path 8. The communication path 8 interconnects the two parallel paths 4 and 6. The select lever 2 moves through the communication path 8 from the "D" 25 position of the automatic shift path 4 to the manual shift path 6 and vice versa. While it is manually operated to select the upshift "+" or the downshift "−", the select lever 2 moves along the manual shift path 6.

To monitor the position of the select lever 2, the range selector 1 is equipped with three sensor switches, namely a manual mode switch 30, an upshift switch 32 and a downshift switch 34. The manual mode switch 30 is provided to indicate that the select lever 2 is not in the manual shift path 6. The upshift switch 32 is operative, in response to selection of the upshift "+" by the select lever 2, to indicate an operator upshift demand. The downshift switch 34 is operative, in response to selection of the downshift "−" by the select lever 2, to indicate an operator downshift demand.

Figure 3:
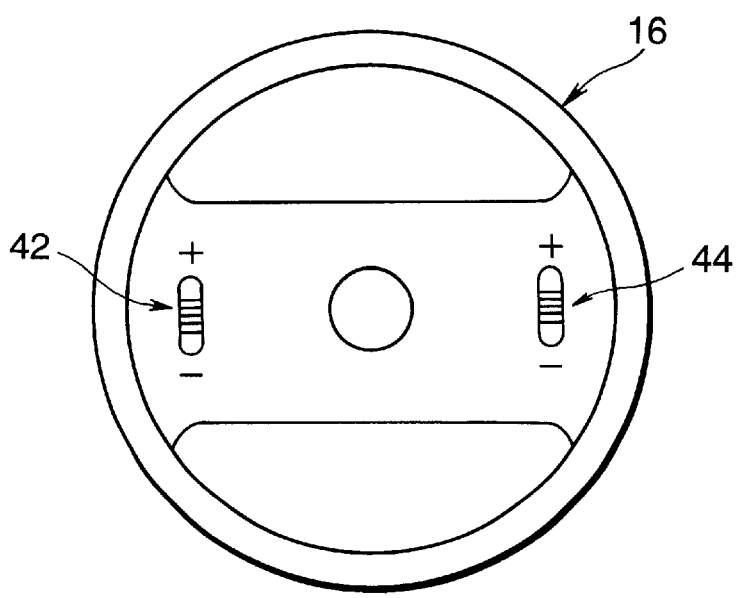
FIG. 3 is a schematic plan view of a steering wheel with two up-down select switches.

FIG. 3 illustrates schematically a steering wheel 16 within the vehicle cabin. This steering wheel 16 is provided with a first and a second up-down select switch 42 and 44. Viewing the steering wheel 16 from an operator within a driver's seat, the first up-down select switch 42 is on the left-hand side and the second up-down select switch 44 is on the right-hand side with respect to an axis of rotation of the steering wheel 16. Each of these up-down switches 42 and 44 has a manually movable element. Moving the movable element in an upward direction results in selection of an upshift "+". Moving the movable element in a downward direction results in selection of a downshift "−". Thus, each up-down select switch 42 or 44 is operative, in response to selection of the upshift "+" by manual operation of the up-down select switch, to indicate an operator upshift demand. It is also operative, in response to selection of the downshift "−" by manual operation of the up-down select switch, to indicate an operator downshift demand. In this example, two up-down select switches 42 and 44 are mounted to the steering wheel 16. The number of such up-down select switches may be one instead of two. Location of such up-down select switches is not limited to the steering wheel 16. An up-down select switch may be mounted anywhere within the reach of the operator within the driver's seat.

As discussion proceeds in connection with FIG. 1, it will be understood that there is a circuit that is closed when the manual mode switch 30 indicates that the select lever 2 is not in the manual shift path 6. The upshift switch 32 forms a part of a first circuit. This circuit is closed in response to indication of an operator upshift demand by the upshift switch 32. The downshift switch 34 forms a part of a second circuit. This circuit is closed in response to indication of an operator downshift demand by the downshift switch 34. The up-down switches 42 and 44 form parts of two parallel circuits, respectively. One of these circuits, namely a third circuit, is closed in response to indication of an operator upshift demand by the up-down select switch 42 or 44 under a predetermined condition. The predetermined condition is met when the select lever 16 is placed in a position selecting the manual ratio change mode and stays away from the upshift "+" and the downshift "−". The other of the two parallel circuits, namely a fourth circuit, is closed in response to indication of an operator downshift demand by the up-down select switch 42 or 44 under the predetermined condition.

A transmission control unit 50 has a first input terminal 36a. The input terminal 36a is connected via a diode 46g to the circuit, which includes the manual mode switch 30. A second input terminal 36b of the control unit 50 is connected via a diode 46f to a circuit, which is closed when the select lever 2 is in the position selecting the manual ratio change mode and stays away from the upshift "+" and the downshift "−". A third or an operator downshift demand input terminal 36c is connected via a diode 46e to the second circuit, which includes the downshift switch 34, and via a diode 46c to the fourth circuit which includes each of the up-down select switches 42 and 44. A fourth input terminal 36d is connected to an output terminal of a logic gate 48. A fifth or an operator upshift demand input terminal 36e is connected via a diode 46d to the first circuit, which includes the upshift switch 32, and via a diode 46b to the third circuit, which includes each of the up-down select switches 42 and 44. A predetermined voltage, preferably 5 Volts, is applied to each of the five input terminals 36a to 36e.

The first up-down select switch 42 has a movable contact 42a. The movable contact 42a is connected to a seventh signal line 40g. A sixth signal line 40f is connected at one end to a second stationary contact 34c of the downshift switch 34 and at the other end to the input terminal 36b of the control unit 50. The seventh signal line 40g includes the diode 46a. When the operator selects the downshift "−" through the first up-down select switch 42, the movable contact 42a comes into contact with a first stationary contact 42b. The first stationary contact 42b is connected to the input terminal 36e of the control unit 50 via a first signal line 40a that is provided with the diode 46b. When operator selects the upshift "+" through the first up-down select switch 42, the movable contact 42a comes into contact with a second stationary contact 42c. The second stationary contact 42c is connected to the input terminal 36c of the control unit 50 via a second signal line 40b that is provided with the diode 46c.

The second up-down select switch 44 has a movable contact 44a, a first stationary contact 44b and a second stationary contact 44c. The movable contact 44a is connected to the seventh signal line 40g at a section between the diode 46a and the movable contact 42a. The first stationary contact 44b is connected to the first signal line 40a. The second stationary contact 44c is connected to the second signal line 40b.

The diode 46b divides the first signal line 40a into a first section, which the first stationary contacts 42b and 44b of the first and second up-down select switches 42 and 44 are connected to, and a second section connected to the input terminal 36e. The diode 46c divides the second signal line 40b into a first section, which the second stationary contacts 42c and 44c of the first and second up-down select switches 42 and 44 are connected to, and a second section connected to the input terminal 36c.

The first section of the first signal line 40a is connected to a source of predetermined voltage VIGN through a resistor.

The first section of the second signal line 40b is connected to the source of predetermined voltage VIGN through a resistor.

The logic gate 48 has a first input terminal connected to the first section of the first signal line 40a. A second input terminal of the gate 48 is connected to the first section of the second signal line 40b. The output terminal of the gate 48 is connected to the input terminal 36d of the control unit 50. The gate 48 has the property that a potential level at the output terminal is low ("L") if and only if potential level at each of the first and second input terminals is high ("H") level. The gate 48 may be constructed of a NAND logic gate. The level of the output terminal of the gate 48 is "L" level if and only if no current passes through each of the first sections of the first and second signal lines 40a and 40b. The signal level of the first input terminal is at "ON" level if the operator selects the upshift "+" through the first or second up-down select switch 42 or 44 with the manual select lever 2 in the automatic shift path 4. The signal level of the second input terminal is at "ON" level if the operator selects the downshift "−" through the first or second up-down select switch 42 or 44 with the manual select lever 2 in the automatic shift path 4.

The manual mode switch 30 has a movable contact 30a connected to ground $E_3$. A first stationary contact 30b of the manual mode switch 30 is connected via a third signal line 40c to the input terminal 36a of the control unit 50. The third signal line 40c is provided with the diode 46g. A second stationary contact 30c of the manual mode switch 30 is connected to the movable contact 32a of the upshift switch 32. The diode 46g divides the third signal line 40c into a first section connected to the first stationary contact 30b and a second section connected to the input terminal 36a. The first section of the third signal line 40c is connected via a resistor to the source of predetermined voltage VIGN.

The upshift switch 32 has a movable contact 32a connected to the second stationary contact 30c of the manual mode switch 30. The movable contact 32a is kept in contact with a second stationary contact 32c if the select lever 2 stays away from the upshift switch 32. If the operator selects the upshift "+" through the select lever 2, the movable contact 32a contacts with a first stationary contact 32b. The first stationary contact 32b of the upshift switch 32 is connected via a fourth signal line 40d to the second section of the first signal line 40a. The second stationary contact 32c of the upshift switch 32 is connected to a movable contact 34a of the downshift switch 34. The fourth signal line 40d is provided with the diode 46d. The diode 46d divides the fourth signal line 40d into a first section connected to the first stationary contact 32b of the upshift switch 32 and a second section connected to the second section of the first signal line 40a. The first section of the fourth signal line 40d is connected via a resistor to the source of predetermined voltage VIGN.

The downshift switch 34 includes a first stationary contact 34b and a second stationary contact 34c. The movable contact 34a is kept in contact with the second stationary contact 34c if the select lever 2 stays away from the downshift switch 34. If the operator selects the downshift "−" through the select lever 2, the movable contact 34a contacts with the first stationary contact 34b. The first stationary contact 34b of the downshift switch 34 is connected via a fifth signal line 40e to the second section of the second signal line 40b. The fifth signal line 40e is provided with the diode 46e. The diode 46e divides the fifth signal line 40e into a first section connected to the first stationary contact 34b of the downshift switch 32 and a second section connected to the second section of the second signal line 40b. The first section of the fifth signal line 40e is connected via a resistor to the source of predetermined voltage VIGN. The second stationary contact 34c of the downshift switch 34 is connected via a sixth signal line 40f to the input terminal 36b. The sixth signal line 40f is provided with the diode 46f. The diode 46f divides the sixth signal line 40f into a first section connected to the second stationary contact 34c and a second section connected to the input terminal 36b. The first section of the sixth signal line 40f is connected via a resistor to the source of predetermined voltage VIGN.

As mentioned before, each of the first to fifth input terminals 36a to 36e of the control unit 50 is subjected to the predetermined voltage. Thus, a potential level at the input terminal 36a is low ("L") when the movable contact 30a engages with the first stationary contact 30b or high ("H") when it disengages from the first stationary contact 30b. A potential level at the input terminal 36b is normally "H". But, it is "L" only when the movable contact 34a of the downshift switch 34 engages with the second stationary contact 34c if the movable contacts 32a and 30a of the upshift switch 32 and manual mode switch 30 engage with the second stationary contacts 32c and 30c, respectively. The manual mode switch 30, upshift switch 32 and downshift switch 34 form a part of ground connection between each of the two up-down select switches 42 and 44 and ground $E_3$ when the movable contacts 30a, 32a and 34a engage the second stationary contacts 30c, 32c and 34c, respectively. Under condition where this ground connection is made, a potential level of the input terminal 36c is normally "H". But, it is "L" only when the movable contact 42a of the first up-down select switch 42 engages with the second stationary contact 42c and/or the movable contact 44a of the second up-down select switch 44 engages with the second stationary contact 44c. A potential level of the input terminal 36e is normally "H". But, it is "L" only when the movable contact 42a of the first up-down select switch 42 engages with the first stationary contact 42b and/or the movable contact 44a of the second up-down select switch 44 engages with the first stationary contact 44b.

The control unit 50 comprises chattering preventing circuits 52a, 52b, 52c, 52d and 52e, which are connected to the first to fifth input terminals 36a, 36b, 36c, 36d and 36e, respectively, and a microcomputer 54. Each of such chattering preventing circuits 52a, 52b, 52c, 52d and 52e is preferably in the form of a circuit that utilizes a Schmidt trigger circuit or a circuit implementing R-S-FF. This circuit arrangement prevents occurrence of voltage noise (chattering) inherent with ON and OFF signal due to mechanical interference between contacts upon operating the manual mode, upshift, downshift, first up-down select and second up-down select switches 30, 32, 34, 42 and 44.

The microcomputer 54 includes an input interface circuit 54a, an arithmetic processing unit 54b preferably in the form of a microprocessor unit (MPU), a memory 54c including a read only memory (ROM) and a random access memory (RAM), and an output interface 54d. The input interface circuit 54a has an analog to digital (AID) converting function. The output interface circuit 54d has a digital to analog (D/A) converting function. The chattering preventing circuit 52a that is connected to the input terminal 36a is adapted to output a not manual mode signal Sa. The chattering preventing circuit 52b that is connected to the input terminal 36b is adapted to output a manual mode select signal Sb. The chattering preventing circuit 52c that is connected to the input terminal 36c is adapted to output a down SW signal Sc. The chattering preventing circuit 52d that is connected to the input terminal 36d is adapted to output a not up nor down signal Sd. The chattering preventing circuit 52e that is connected to the input terminal 36e is adapted to output an up SW signal Se. Each of these five kinds of signals is used as the input to the input interface circuit 54a. Based on the results of arithmetic operation, the MPU 54b generates an automatic shift demand for automatic ratio change mode or an upshift demand for manual ratio change mode or a downshift demand for manual ratio change mode. The MPU 54b performs a ratio control routine based on such demands and controls via the output interface circuit 54d a ratio control actuator 56.

Each of the signals Sa, Sb, Sc, Sd and Se is a two-level signal having an "OFF" level when the potential level of the associated input terminal is "H" and an "ON" level when the potential level of the input terminal is "L".

In response to "ON" level of not manual mode signal Sa, the MPU 54b executes an automatic ratio change control routine. The memory 54c stores various shift patterns appropriate to various transmission range positions "D", "2" and "1". According to this automatic ratio control routine, the MPU 54b selects one appropriate shift pattern to the selected position. The MPU 54b retrieves the selected shift pattern based on current engine load, engine speed and vehicle speed to determine a desired ratio. The engine throttle opening degree may be considered as a parameter representing the magnitude of the engine load. The MPU 54b generates an automatic shift demand $CS_A$ for an automatic shift to the determined desired ratio.

The MPU 54b generates an upshift demand $CS_U$ for a shift from the current ratio up to the adjacent ratio in response to a change of the up SW signal Se from "OFF" to "ON" level when the down SW signal Sc stays at "OFF" level. The MPU 54b generates a downshift demand $CS_D$ for a shift from the current ratio down to the adjacent ratio in response to a change of the down SW signal Sc from "OFF" to "ON" level when the up SW signal Se stays at "OFF" level If concurrent presence of "ON" level up and down SW signals Se and Sc continues over a first predetermined time period $CNT3_{max}$, the MPU 54b applies a first kind of warning signal $CS_{W1}$ to a device preferably in the form of a display 58. The display may be in the form of a light in an instrument panel. In response to this first kind of warning signal $CS_{W1}$, the lamp may flush to notify the operator the occurrence of concurrent application of "ON" level signals to the down-signal and up-signal input terminals 36c and 36e. If the display 58 is used, a predetermined message may be visualized to urge the operator to hand off one of the first and second up-down select switches 42 and 44. If this concurrent presence of "ON" level signals Se and Sc further continues over the subsequent another period of time period, the MPU 54b applies a second kind of warning signal $CS_{W2}$ to the device 58. Upon or immediately after generation of the second kind of warding signal $CS_{W2}$, the MPU 54b generates the automatic ratio change demand $CS_A$ and forces the ratio control actuator 56 to perform the automatic ratio change. In response to this second kind of warning signal $CS_{W2}$, the lamp within the instrument panel may flush rapidly or a predetermined message may be visualized to notify the operator the possibility of occurrence of circuit failure.

If the operator manipulates the select lever 2 in the automatic shift path 4, the manual mode switch 30 has its movable contact 30a contacting with the first stationary contact 30b as illustrated in FIG. 1. This causes potential level at the input terminal 36a to take "L" level, causing the signal Sa to take "ON" level.

Let us consider the case where the operator moves the select lever 2 through the communication path 8 and positions the select lever 2 in the manual shift path 6 away from the upshift and downshift "+" and "−". In this case, the manual mode switch 30 has its movable contact 30a contacting with the second stationary contact 30c, the upshift and downshift switches 32 and 34 have their movable contacts 32a and 34a contacting with their respective second stationary contacts 32c and 34c, respectively. This causes potential level at the input terminal 36b to take "L" level, causing the signal Sb to take "ON" level.

Potential level at the input terminal 36e is "L" and thus the up SW signal Se takes "ON" level if, with signal Sb level maintained at "ON" level, the operator manipulates the first up-down select switch 42 to select the upshift "+". In this upshift "+", the first up-down select switch 42 has its movable contact 42a contacting with its first stationary contact 42b. If, with the signal Sb maintained at "ON" level, the operator manipulates the first up-down select switch 42 to select the downshift "−", potential level at the input terminal 36c is "L", so that the signal Sc takes "ON" level. In this downshift "−", the first up-down select switch 42 has its movable contact 42a contacting with the second stationary contact 42c. Similarly, if the operator manipulates the second up-down select switch 44 to select the upshift "+", potential level at the input terminal 36e is "L", so that the signal Se takes "ON" level. In this upshift "+", the second up-down select switch 44 has its movable contact 44a contacting with its first stationary contact 44b. If the operator manipulates the second up-down select switch 44 to select the downshift "−", potential level at the input terminal 36c is "L", so that the signal Sc takes "ON" level. In this downshift "−", the second up-down select switch 44 has its movable contact 44a contacting with its second stationary contact 44c.

If both of the first and second up-down select switches 42 and 44 stay away from their upshift and downshift "+" and "−", no current passes through the first sections of the first and second signal lines 40a and 40b. Potential levels at the first and second input terminals of the logic gate 48 are "H", respectively, causing potential level at the output terminal of the logic gate 48 to take "L" level. Thus, potential level at the input terminal 36d is "L", so that the signal Sd takes "ON" level.

If the operator selects the upshift "+" through manipulation of the select lever 2, potential level at the input terminal 36e is "L", so that the signal Se takes "ON" level. In this upshift "+", the upshift switch 32 has its movable contact 32a contacting with its first stationary contact 32b, allowing current to pass through the first section of the signal line 40d. If the operator selects the downshift "−" through manipulation of the select lever 2, potential level at the input terminal 36c is "L", so that the signal Sc takes "ON" level. In this downshift "−", the downshift switch 34 has its movable contact 34a contacting with its first stationary contact 34b, allowing current to pass through the first section of the signal line 40e.

If the select lever 2 is at the upshift "+" or the downshift "−", manipulation of the first and second up-down select switches 42 and 44 to select the upshift "+" or the downshift "−" becomes invalid. That is, the first or the second up-down select switch 42 or 44 may be used to select the upshift "+" or the downshift "−", if and only if the select lever 2 is positioned in the manual shift path 6 away from the upshift and downshift "+" and "−".

From the preceding description along mainly with FIG. 1, it will now be seen that the upshift switch 32 indicates an operator upshift demand through the select lever 2 when its movable contact 32a is in contact with its first stationary contact 32b. The first and second up-down select switches 42 and 44 indicate an operator upshift demand when the movable contact 42a or 44a is in contact with its associated first stationary contact 42b or 44b. These up-down select switches 42 and 44 indicate two operator upshift demands when the movable contacts 42a and 44a are in contact with the first stationary contacts 42b and 44b, respectively.

The downshift switch 34 indicates an operator downshift demand through the select lever 2 when its movable contact 34a is in contact with its first stationary contact 34b. The first and second up-down select switches 42 and 44 indicate an operator downshift demand when the movable contact 42a or 44a is in contact with its associated second stationary contact 42c or 44c. These up-down select switches 42 and 44 indicate two operator downshift demands when the movable contacts 42a and 44a are in contact with the second stationary contacts 42c and 44c, respectively.

FIGS. 4 to 7 are flow charts illustrating the preferred implementation of the present invention.

Figure 4:
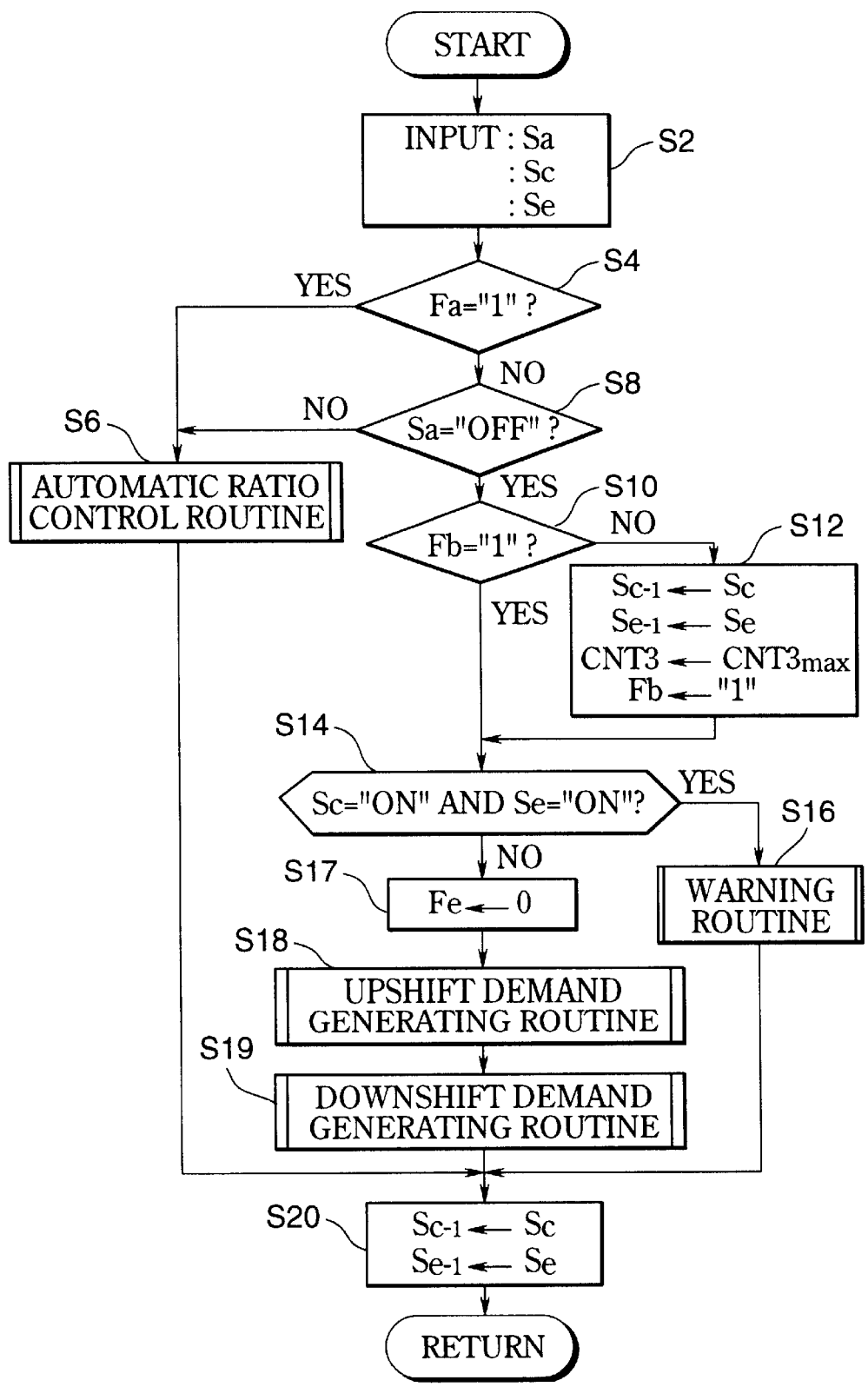
FIG. 4 is a flow chart of a control routine implementing the present invention.

FIG. 4 is a flow chart of a main control routine. The execution of this control routine is initiated by time interruption at regular intervals ΔT. ΔT is a predetermined sampling time of 20 milliseconds in this example. Although not illustrated in program steps, the MPU 54b inputs programs, maps and data from the memory 54c whenever need arises. The computed data by the MPU 54b are stored in the memory 54c to replace the existing data therein. Initial values of first to fifth control flags Fa to Fe are set equal to "0" level.

Referring to FIG. 4, in step S2, the MPU 54b inputs current levels of the not manual mode signal Sa, down SW signal Sc and up SW signal Sa.

In the next step S4, the MPU 54b determines whether or not the first control flag Fa is equal to "1" level. If the flag Fa is equal to "1" level, the routine proceeds to step S6 where the MPU 54b performs an automatic ratio control routine. In the automatic ratio control routine, the MPU 54b selects one shift pattern appropriate to a selected transmission range position. The MPU 54b retrieves the selected shift pattern based on current engine load, engine speed and vehicle speed to determine a desired ratio. The engine throttle opening degree may be considered as a parameter representing the magnitude of the engine load. The MPU 54b generates a demand $CS_A$ for an automatic shift to the determined desired ratio. After this step S6, the routine proceeds to step S20.

If, in step S4, the first control flag Fa is equal to "0" level, the routine proceeds to step S8. In step S8, the MPU 54b determines whether or not the not manual mode signal Sa is equal to "OFF" level. If the not manual mode signal Sa is equal to "OFF" level, the routine proceeds to step S10. If the not manual mode signal Sa is equal to "ON" level, the routine proceeds to step S6.

In step S10, the MPU 54b determines whether or not the second control flag Fb is equal to "1" level. If, in step S10, the second control flag Fb is equal to "1" level, the routine proceeds to step S14. If, in step S10, the second control flag Fb is equal to "0" level, the routine proceeds to step S12. In step S12, the MPU 54b updates the preceding value $Sc_{-1}$ of the down SW signal with the current value Sc of the down SW signal and updates the preceding value $Se_{-1}$ of the up SW signal with the current value Se of the up SW signal. In the same step S12, the MPU 54b loads the control counter CNT3 with a predetermined value CNT3max, and sets the second control flag Fb equal to "1" level. Then, the routine proceeds to step S14. The setting of the predetermined value CNT3max is such that the counter CNT3 becomes zero upon elapse of a predetermined period of time over which concurrent application of "ON" level up and down SW signals Se and Sc to the up-signal and down-signal input terminals 36e and 36c has continued. This predetermined period of time is preferably 1 to 2 seconds.

Figure 5:
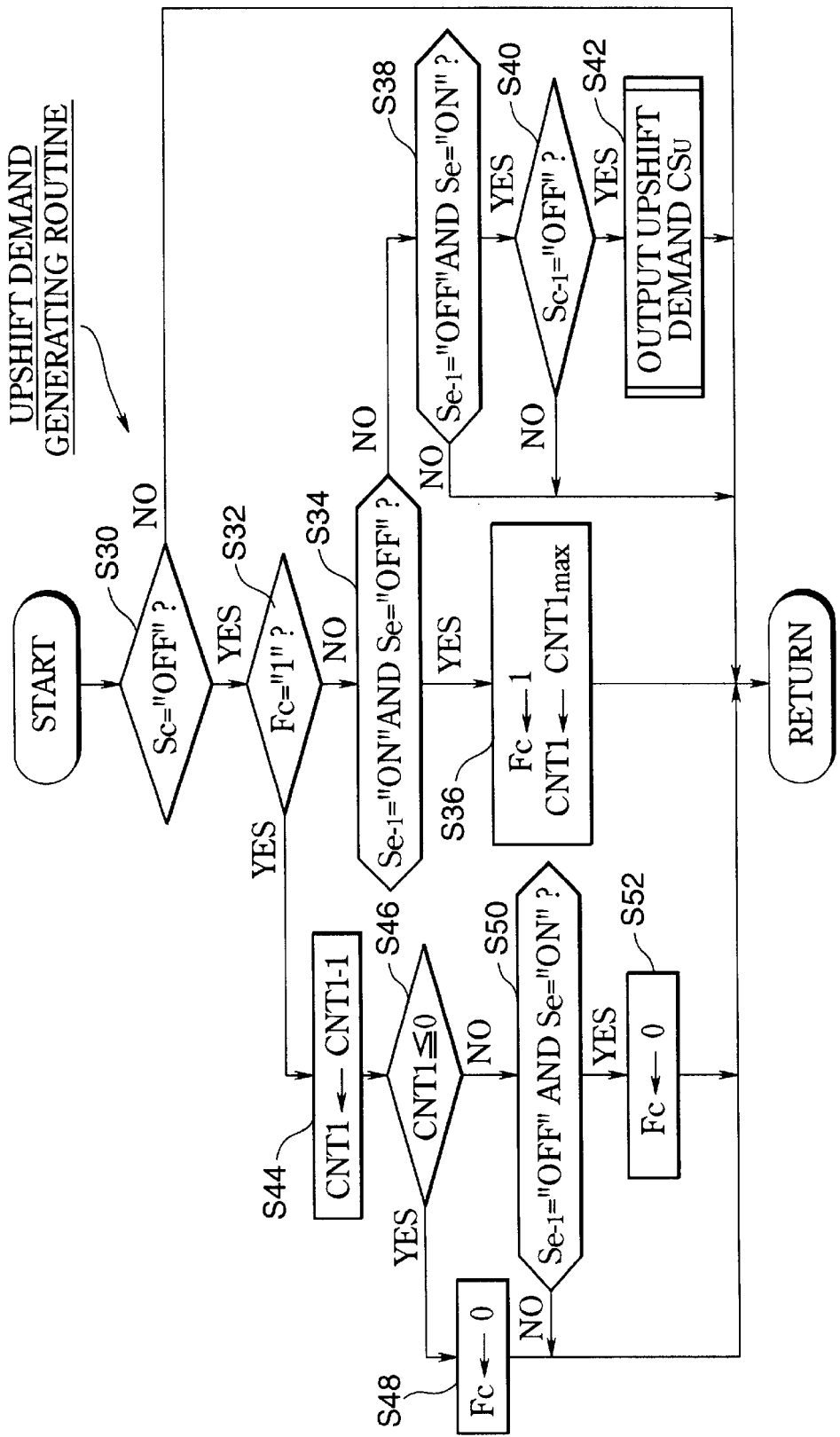
FIG. 5 is a flow chart of an upshift demand generating routine.
Figure 6:
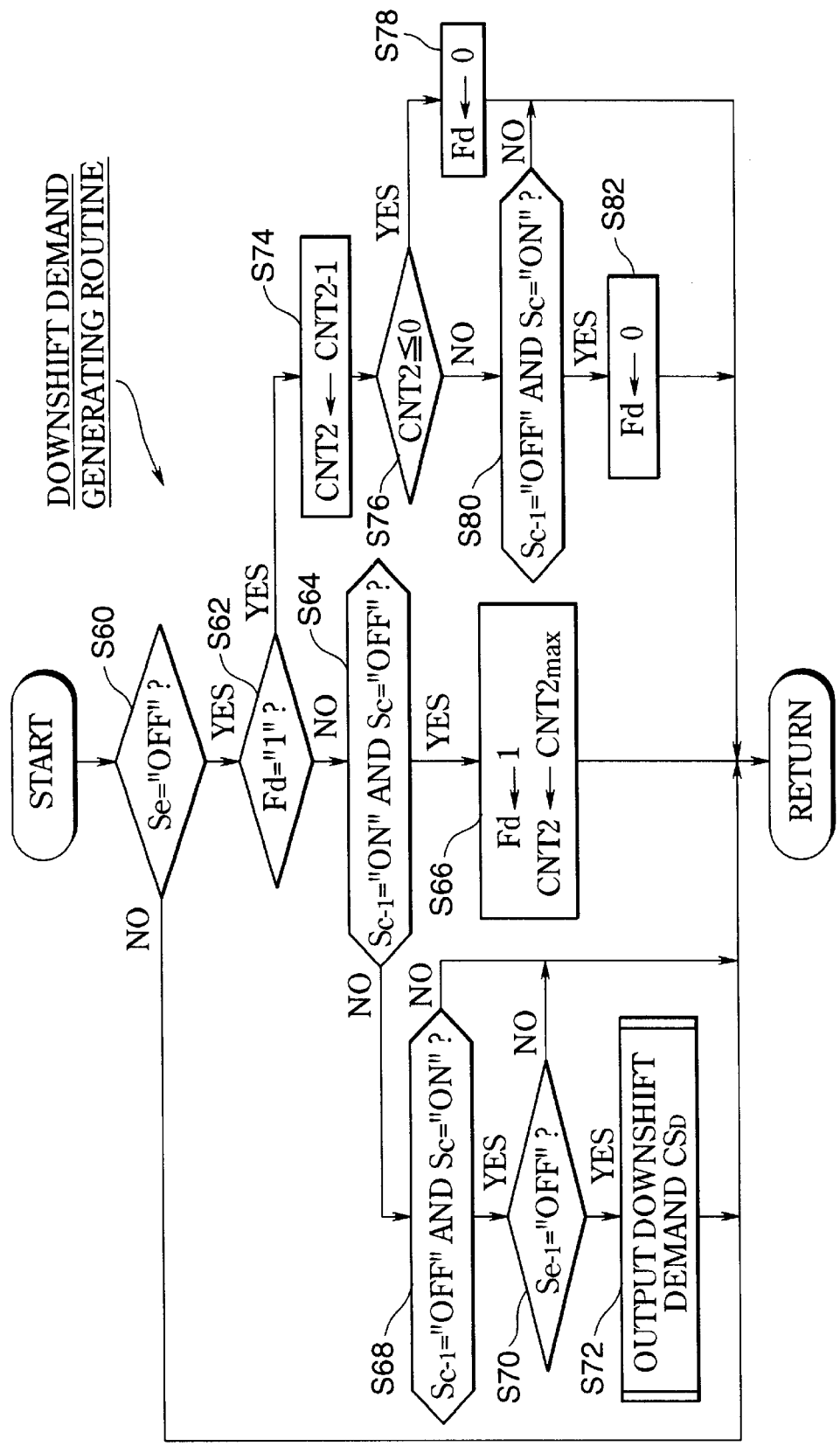
FIG. 6 is a flow chart of a downshift demand generating routine.
Figure 7:
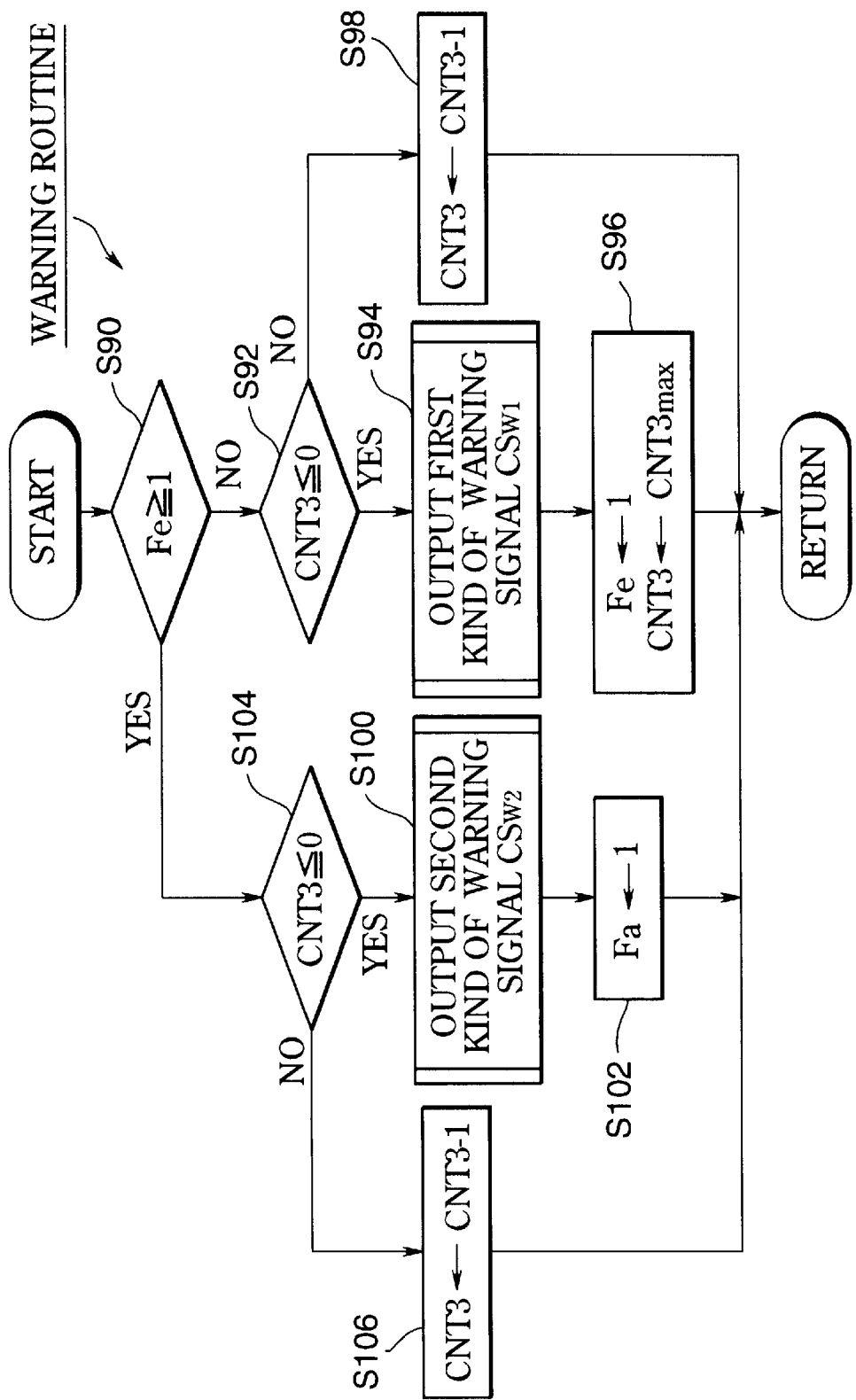
FIG. 7 is a flow chart of a warning routine.

In step S14, the MPU 54b determines whether or not the present down and up SW signals Sc and Se are equal to "ON" levels, respectively. If this is the case, the routine executes a warning routine that is illustrated in FIG. 7. After the warning routine in step S16, the routine proceeds to step S20. If this is not the case, the routine proceeds to step S17 and then to step S18. In step S17, the MPU 54b sets the fourth control flag Fe equal to "0" level In step S18, the MPU 54b executes an upshift demand generating routine that is illustrated in FIG. 5. In next step S19, the MPU 54b executes a downshift demand generating routine that is illustrated in FIG. 6. After the downshift judgement routine, the routine proceeds to step S20.

In step S20, the MPU 54b updates the preceding value $Sc_{-1}$ of the down SW signal with the present value Sc of the down SW signal and updates the preceding value of $Se_{-1}$ of the up SW signal with the present value Se of the up SW signal.

The flow chart of FIG. 5 illustrates the upshift demand generating routine.

In step S30, the MPU 54b determines whether or not the current down SW signal Sc is equal to "OFF". If the current down SW signal Sc is equal to "OFF", the routine proceeds to step S32. If the current down SW signal Sc is equal to "ON" level, the routine returns to step S19 in FIG. 4.

In step S32, the MPU 54b determines whether or not the third control flag Fc is equal to "1" level. If this flag Fc is equal to "1" level, the routine proceeds to step S44. If this flag Fc is equal to "0" level, the routine proceeds to step S34.

In step S34, the MPU 54b determines whether or not the preceding value $Se_{-1}$ of the up SW signal is equal to "ON" level and the current value Se of the up SW signal is equal to "OFF" level. If this is the case, the routine proceeds to step S36. If this is not the case, the routine proceeds to step S38. In step 36, the MPU 54b sets the third control flag Fc equal to "1" level and loads a control counter CNT1 with a predetermined value $CNT1_{MAX}$. The setting of the predetermined value $CNT1_{MAX}$ is such that the counter CNT1 becomes zero upon elapse of a predetermined period of time after a change in up SW signal Se from "ON" level to "OFF" level. Within this predetermined period of time, the MPU 54b will not respond to the subsequent change in up SW signal Se from "OFF" level to "ON" level. This predetermined time is set slightly longer than time required for the movable contact 32a to move from the second stationary contact 32c to the first stationary contact 32b upon manipulating the select lever 2 to indicate an operator upshift demand. This arrangement effectively neglects an operator upshift demand through the select lever 2 while an operator upshift demand through one of the first and second up-down select switch 42 and 44 is present. After step S36, the routine proceeds to step S19 in FIG. 4.

In step S38, the MPU 54b determines whether or not the preceding value $Se_{-1}$ of the up SW signal is equal to "OFF" level and the current value Se of the up SW signal is equal to "ON" level. If this is the case, the routine proceeds to step S40. If this is not the case, the routine proceeds to step S19 in FIG. 4.

In step S40, the MPU 54b determines whether or not the preceding value $Sc_{-1}$ of the down SW signal is equal to "OFF" level. If this is the case, the routine proceeds to step S42. If this is not the case, the routine proceeds to step S19 in FIG. 4. In step S42, the MPU 54b outputs an upshift demand $CS_U$ for a shift from the current ratio up to the adjacent ratio.

If, in step S32, the third control flag Fc is equal to "1" level, the routine proceeds to step S44. In step S44, the MPU 54b performs decrement of the counter CNT1 by one (1). In the next step S46, the MPU 54b determines whether or not the content of the counter CNT1 is equal to or less than zero (0). If this is the case, the routine proceeds to step S48. If this is not the case, the routine proceeds to step S50 and then to step S52. In step S48, the MPU 54b sets the third control flag Fc equal to "0" level. After step S48, the routine proceeds to step S19 in FIG. 4.

In step S50, the MPU 54b determines whether or not the preceding value $Se_{-1}$ of the up SW signal is equal to "OFF" level and the current value Se of the up SW signal is equal to "ON" level. If this is the case, the MPU 54b sets, in step S52, the third control flag Fc equal to "0" level. After step S52, the routine proceeds to step S19 in FIG. 4. If the interrogation in step S50 results in negative, the routine proceeds to step S19 in FIG. 4.

The flow chart of FIG. 6 illustrates the downshift demand generating routine.

In step S60, the MPU 54b determines whether or not the current value Se of the up SW signal is equal to "OFF" level. If this is not the case, the routine proceeds to step S20 in FIG. 4. If this is the case, the routine proceeds to step S62.

In step S62, the MPU 54b determines whether or not the fourth control flag Fd is equal to "1" level. If this is the case, the routine proceeds to step S74. If this is not the case, the routine proceeds to step S64.

In step S64, the MPU 54b determines whether or not the preceding value $Sc_{-1}$ of the down SW signal is equal to "ON" level and the current value Sc of the down SW signal is equal to "OFF" level. If this is the case, the routine proceeds to step S66. If this is not the case, the routine proceeds to step S68.

In step S66, the MPU 54b sets the fourth control flag Fd equal to "1" level and loads a control counter CNT2 with a predetermined value $CNT2_{MAX}$. The setting of the predetermined value $CNT2_{MAX}$ is such that the counter CNT2 becomes zero upon elapse of a predetermined period of time after a change in down SW signal Sc from "ON" level to "OFF" level Within this predetermined period of time, the MPU 54b will not respond to the subsequent change in down SW signal Sc from "OFF" level to "ON" level. The predetermined period of time is equivalent to time required for the movable contact 34a to move from the second stationary contact 34c to the first stationary contact 34b upon manipulating the select lever to indicate an operator downshift demand. This arrangement effectively neglects an operator downshift demand through the select lever 2 while an operator downshift demand through one of the first and second up-down select switches 42 and 44 is present. After step S66, the routine proceeds to step S20 in FIG. 4.

In step S68, the MPU 54b determines whether or not the preceding value $Sc_{-1}$ of the down SW signal is equal to "OFF" level and the current value Sc of the down SW signal is equal to "ON" level. If this is the case, the routine proceeds to step S70. If this is not the case, the routine proceeds to step S20 in FIG. 4.

In step S70, the MPU 54b determines whether or not the preceding value $Se_{-1}$ of the up SW signal is equal to "OFF" level. If this is the case, the routine proceeds to step S72. If this is not the case, the routine proceeds to step S20 in FIG. 4. In step S72, the MPU 54b outputs a downshift demand $CS_D$ for a shift from the current ratio down to the adjacent ratio.

If, in step S62, the fourth control flag Fd is equal to "1" level, the routine proceeds to step S74. In step S74, the MPU 54b performs decrement of the counter CNT2 by one (1). In the next step S76, the MPU 54b determines whether or not the content of the counter CNT2 is equal to or less than zero (0). If this is the case, the routine proceeds to step S78. If this is not the case, the routine proceeds to step S80 and then to step S82. In step S78, the MPU 54b sets the fourth control flag Fd equal to "0" level. After step S78, the routine proceeds to step S20 in FIG. 4.

In step S80, the MPU 54b determines whether or not the preceding value $Sc_{-1}$ of the down SW signal is equal to "OFF" level and the current value Sc of the down SW signal is equal to "ON" level. If this is the case, the MPU 54b sets, in step S82, the fourth control flag Fd equal to "0" level. After step S82, the routine proceeds to step S20 in FIG. 4. If the interrogation in step S80 results in negative, the routine proceeds to step S20 in FIG. 4.

The flow chart of FIG. 7 illustrates the warning routine.

In step S90, the MPU 54b determines whether or not the fifth control flag Fe is equal to or greater than "1" level. If this is the case, the routine proceeds to step S104. If this is not the case, the routine proceeds to step S92.

In step S92, the MPU 54b determines whether or not the control counter CNT3 is equal to or less than zero (0). If, in step S92, the content of the control counter CNT3 is greater than zero (0), the routine proceeds to step S98. In step S98, the MPU 54b performs decrement of the counter CNT3 by one (1). After step S98, the routine proceeds to step S20 in FIG. 4.

If, in step S92, the content of the control counter CNT3 has become equal to or less than zero (0), the routine proceeds to step S94 and then to step S96. In step S94, the MPU 54b outputs a first kind of warning signal $CS_{W1}$. The display 58 responds to the first kind of warning signal $CS_{W1}$ and visually presents a message that "Concurrent application of up and down SW signals Se and Sc or invalid operator manipulation of the up-down select switches has occurred." In step S96, the MPU 54b sets the fifth control flag Fe equal to "1" level, and it also loads the control counter CNT3 with the predetermined value CNT3$_{MAX}$. After step S96, the routine proceeds to step S20 in FIG. 4. In step S96, a different predetermined value from the predetermined value CNT3$_{MAX}$ may be loaded into the counter CNT3. The setting of this different predetermined value is such that the counter CNT3 becomes zero upon elapse of a predetermined period of time of 2 to 3 seconds.

If, in step S90, the MPU 54b determines that the fifth control flag Fe is equal to or greater than one (1), the routine proceeds to step S104.

In step S104, the MPU 54b determines whether or not the control counter CNT3 is equal to or less than zero (0). If, in step S104, the content of the control counter CNT3 is greater than zero (0), the routine proceeds to step S106. In step S106, the MPU 54b performs decrement of the counter CNT3 by one (1). After step S106, the routine proceeds to step S20 in FIG. 4.

If, in step S104, the content of the control counter CNT3 has become equal to or less than zero (0), the routine proceeds to step S100 and then to step S102. In step S100, the MPU 54b outputs a second kind of warning signal CS$_{W2}$. The display 58 responds to the second kind of warning signal CS$_{W2}$ and visually presents a message that "Circuit failure has occurred or the invalid operator manipulation still continues." In step S102, the MPU 54b sets the first control flag Fa equal to "1" level. After step Si 02, the routine proceeds to step S20 in FIG. 4.

If, in step S104, the content of the control counter CNT3 is greater than zero (0), the routine proceeds to step S106. In step S106, the MPU 54b performs decrement of the counter CNT3 by one (1). After step S106, the routine proceeds to step S20 in FIG. 4.

Subsequently after generation of the second kind of warning signal CS$_{W2}$, the MPU 54b executes automatic ratio control routine in step S6 because the control flag Fa has been set equal to "1" level.

Figure 8:
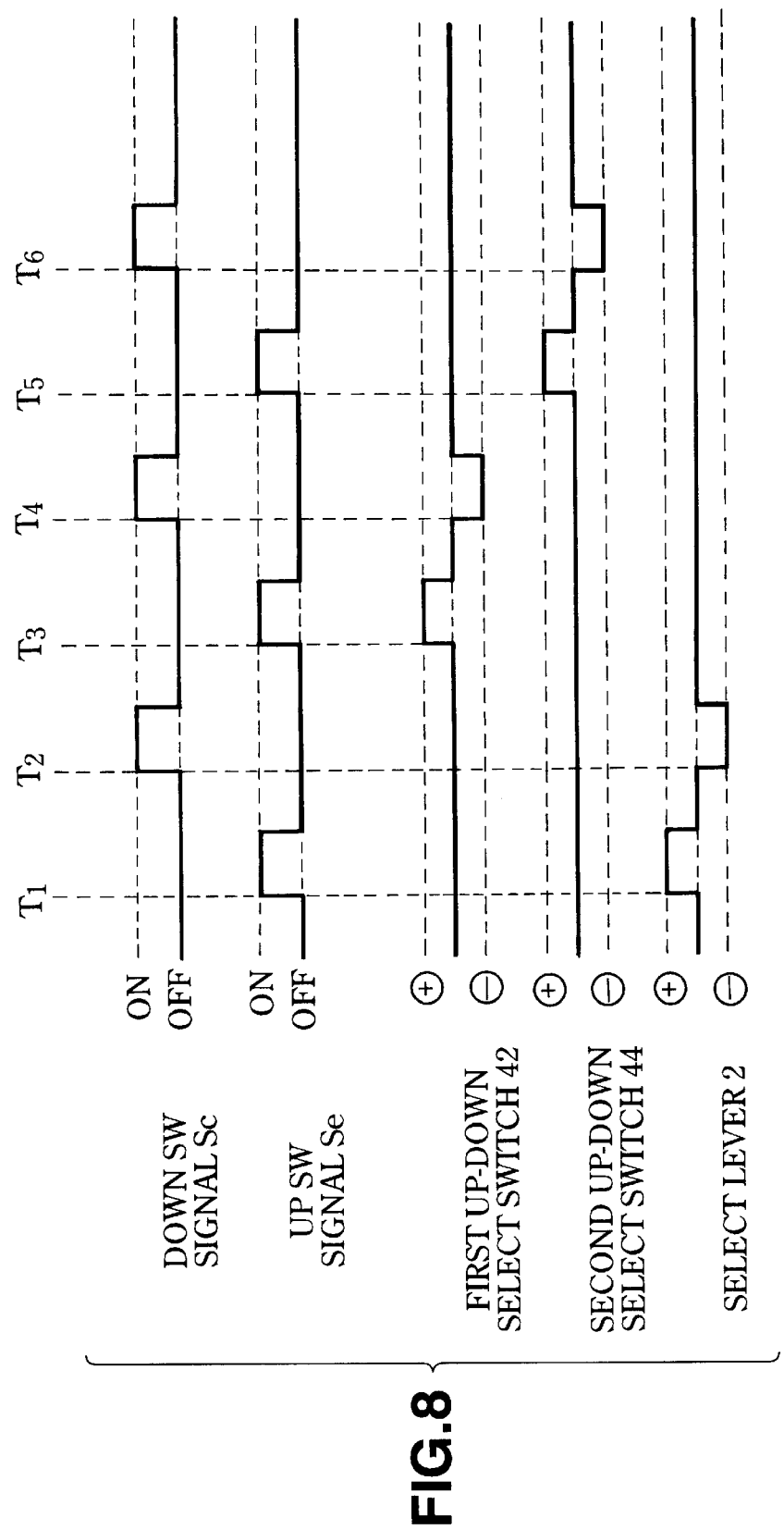
FIG. 8 illustrates variation of an up SW signal and a down SW signal in response to an operator shift demand through one of a first up-down select switch, a second up-down select switch and a select lever.
Figure 9:
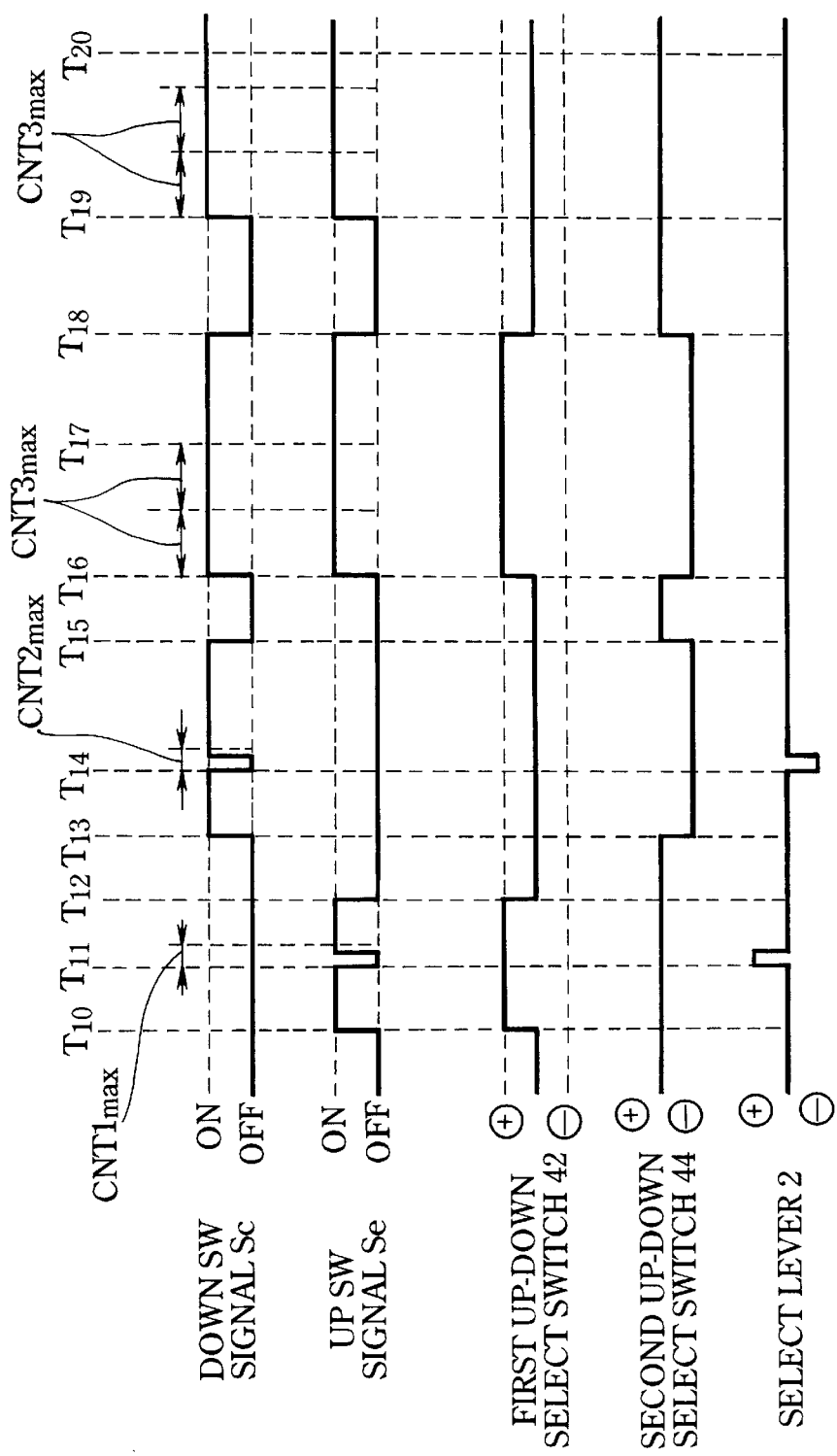
FIG. 9 illustrates variation of the up and down SW signals in response to operator shift demands through concurrently manipulation of the first up-down select switch, second up-down select switch and select lever.

Referring also to FIGS. 8 and 9, the preferred implementation is further described.

FIG. 8 is a simplified illustration of variations of up and down SW signals Se and Sc in response to application of a single operator shift demand through the first up-down select switch 42 or the second up-down select switch 44 or the select lever 2. Assume that, before moment T$_1$, each of the first and second up-down switches 42 and 44 stays away from its upshift "+" and downshift "−" and the select lever 2 stays in the manual shift path 6 away from its upshift "+" and downshift "−". Under this condition, any operator upshift or downshift demand is not indicated, so that the down and up SW signals Sc and Se are at "OFF" levels. Under this condition, immediately after the operator has turned a key, such as an engine key of the vehicle, to a predetermined position, the MPU 54b executes initialization of various control flags Fa, Fb, Fc and Fd and counters CNT1, CNT2 and CNT3. Subsequently, the MPU 54b executes an initial run. In this initial run, the routine proceeds along steps S2, S4, S8, S10, S12, S14, S17, S18, S19 and S20 (see FIG. 4). Referring to the upshift demand generating routine in FIG. 5, the routine proceeds along steps S30, S32, S34 and S38. Referring to the downshift demand generating routine in FIG. 6, the routine proceeds along steps S60, S62, S64 and S68. Subsequently after this initial run, the MPU 54b repeats execution of a flow of jobs along steps S2, S4, S8, S10, S14, S17, S18, S19 and S20 (see FIG. 4). A flow of jobs through each of the routines in FIGS. 5 and 6 remains the same as those of the initial run as long as the up and down SW signals Se and Sc remain at the same "OFF" level.

In FIG. 8, at moment T$_1$, the operator moves the manual select lever 2 to the upshift "+" to indicate an operator upshift demand through the upshift switch 32. This causes a change in level of the up SW signal Se to "ON" level Upon or immediately after moment T$_1$, the MPU 54b executes jobs along a flow of steps S2, S4, S8, S10, S14, S17, S30, S32, S34, S38, S40, S42, S60 and S20. In step S38, the MPU 54b determines that the preceding value Se$_{-1}$, of up SW signal is "OFF" and the current value Se is "ON" After step S38, the routine proceeds to step S40 and then to step S42. In step S40, the MPU 54b determines whether the preceding value Sc$_{-1}$ is "OFF". In step S42, the MPU 54b outputs an upshift demand CS$_U$. Subsequently, the MPU 54b repeats execution of jobs along steps S2, S4, S8, S10, S14, S17, S30, S32, S34, S38, S60 and S20 until the up SW signal Se changes from "ON" level to "OFF" level due to disappearance of the operator upshift demand. Upon or immediately after this change of up SW signal Se from "ON" to "OFF" level, the MPU 54b executes jobs along steps S2, S4, S8, S10, S14, S17, S30, S32, S34, S36, S60, S62, S64, S68 and S20. In step S34, the MPU 54b determines that the preceding value Se$_{-1}$, is "ON" and the current value Se is "OFF" and, in the next step S36, sets the flag Fc equal to one (1) and loads the control counter CNT1 with the predetermined value CNT1$_{max}$. Subsequently after the flag Fc has been set equal to one (1), the MPU 54b repeats execution of jobs along steps S2, S4, S8, S10, S14, S17, S30, S32, S44, S46, S50, S60, S62, S64, S68 and S20. This repetition continues until the counter CNT1 will become equal to or less than zero (0). Immediately after determination, in step S46, that the content of counter CNT1 is equal to or less than zero (0), the MPU 54b resets the flag Fc in step S48. Subsequently after the flag Fc has been reset, the MPU 54b repeats execution of jobs along steps S2, S4, S8, S10, S14, S17, S30, S32, S34, S38, S60, S62, S64, S68 and S20 until moment T$_2$.

From the preceding description, it will now be understood that the software generates an upshift demand CS$_U$ in response to a change in the up SW signal Se from "OFF" level to "ON" level when the down SW signal Sc is at "OFF" level (see steps S38, S40 and S42).

Referring to FIG. 8, at moment T$_2$, the operator moves the manual select lever 2 to the downshift "−" to indicate an operator downshift demand through the downshift switch 34. This causes a change in level of the down SW signal Sc to "ON" level. Upon or immediately after moment T$_2$, the MPU 54b executes jobs along steps S2, S4, S8, S10, S14, S17, S30, S60, S62, S64, S68, S70, S72 and S20. In step S68, the MPU 54b determines that the preceding value Sc$_{-1}$ of the down SW signal is "OFF" and the current value Sc is "ON". After step S68, the routine proceeds to step S70 and then to step S72. In step S72, the MPU 54b outputs a downshift demand CS$_D$. Subsequently, the MPU 54b repeats execution of jobs along steps S2, S4, S8, S10, S14, S17, S30, S60, S62, S64, S68 and S20 until the down SW signal Sc changes from "ON" level to "OFF" level due to disappearance of the operator downshift demand. Upon or immediately after this change of down SW signal Sc from "ON" to "OFF" level, the MPU 54b executes jobs along steps S2, S4, S8, S10, S14, S17, S30, S32, S34, S38, S60, S62, S64, S66 and S20. In step S64, the MPU 54b determines that the preceding value Sc$_{-1}$ of the down SW signal is "ON" and the current value Sc is "OFF" and, in the next step S66, sets the flag Fd equal to one (1) and loads the counter CNT2 with the predetermined value $CNT2_{max}$. Subsequently after the flag Fd has been set equal to one (1), the MPU 54b repeats execution of jobs along steps S2, S4, S8, S10, S14, S17, S30, S32, S34, S38, S60, S62, S74, S76, S80 and S20. This repetition continues until the counter CNT2 will become equal to or less than zero (0). Immediately after determination, in step S76, that the content of counter CNT2 is equal to or less than zero (0), the MPU 54b resets the flag Fd in step S82. Subsequently after the flag Fd has been reset, the MPU 54b repeats execution of jobs along steps S2, S4, S8, S10, S14, S17, S30, S32, S34, S38, S60, S62, S64, S68 and S20 until moment $T_3$.

From the preceding description, it will now be understood that the software generates a downshift demand $CS_D$ in response to a change in the down SW signal Sc from "OFF" level to "ON" level when the up SW signal Se is at "OFF" level (see steps S68, S70 and S72).

Referring to FIG. 8, at moment $T_3$, the operator moves the first up-down select switch 42 to the upshift "+" to indicate an operator upshift demand. This causes a change in level of the up SW signal Se to "ON" level. Upon or immediately after moment $T_3$, the MPU 54b executes jobs along a flow of steps S2, S4, S8, S10, S14, S17, S30, S32, S34, S38, S40, S42, S60 and S20. In step S42, the MPU 54b outputs an upshift demand $CS_U$. Subsequently, the MPU 54b repeats execution of jobs along steps S2, S4, S8, S10, S14, S17, S30, S32, S34, S38, S60 and S20 until the up SW signal Se changes from "ON" level to "OFF" level due to disappearance of the operator upshift demand. Upon or immediately after this change of signal Se from "ON" to "OFF" level, the MPU 54b executes jobs along steps S2, S4, S8, S10, S14, S17, S30, S32, S34, S36, S60, S62, S64, S68 and S20. In step S36, the MPU 54b sets the flag Fc equal to one (1) and loads the counter CNT1 with the predetermined value $CNT1_{max}$. Subsequently after the flag Fc has been set equal to one (1), the MPU 54b repeats execution of jobs along steps S2, S4, S8, S10, S14, S17, S30, S32, S44, S46, S50, S60, S62, S64, S68 and S20. This repetition continues until the counter CNT1 will become equal to or less than zero (0). Immediately after determination, in step S46, that the content of counter CNT1 is equal to or less than zero (0), the MPU 54b resets the flag Fc in step S48. Subsequently after the flag Fc has been reset, the MPU 54b repeats execution of jobs along steps S2, S4, S8, S10, S14, S17, S30, S32, S34, S38, S60, S62, S64, S68 and S20 until moment $T_4$.

Referring to FIG. 8, at moment $T_4$, the operator moves the first up-down select switch 42 to the downshift "−" to indicate an operator downshift demand. This causes a change in level of the down SW signal Sc to "ON" level Upon or immediately after moment $T_4$, the MPU 54b executes jobs along steps S2, S4, S8, S10, S14, S17, S30, S60, S62, S64, S68, S70, S72 and S20. In step S72, the MPU 54b outputs a downshift demand $CS_D$. Subsequently, the MPU 54b repeats execution of jobs along steps S2, S4, S8, S10, S14, S17, S30, S60, S62, S64, S68 and S20 until the down SW signal Sc changes from "ON" to "OFF" level due to disappearance of the operator downshift demand. Upon or immediately after this change of the down SW signal Sc from "ON" to "OFF" level, the MPU 54b executes jobs along steps S2, S4, S8, S10, S14, S17, S30, S32, S34, S38, S60, S62, S64, S66 and S20. In step S66, the MPU 54b sets the flag Fd equal to one (1) and loads the counter CNT2 with the predetermined value $CNT2_{max}$. Subsequently after the flag Fd has been set equal to one (1), the MPU 54b repeats execution of jobs along steps S2, S4, S8, S10, S14, S17, S30, S32, S34, S38, S60, S62, S74, S76, S80 and S20 until the counter CNT2 will become equal to or less than zero (0). Immediately after determination, in step S76, that the content of counter CNT2 is equal to or less than zero (0), the MPU 54b resets the flag Fd in step S78. Subsequently after the flag Fd has been reset, the MPU 54b repeats execution of jobs along steps S2, S4, S8, S10, S14, S17, S30, S32, S34, S38, S60, S62, S64, S68 and S20 until moment $T_5$.

Referring to FIG. 8, at moment $T_5$, the operator moves the second up-down select switch 44 to the upshift "+" to indicate an operator upshift demand. This causes a change in level of the up SW signal Se from "OFF" to "ON" level. Upon or immediately after moment $T_5$, the MPU 54b executes jobs along a flow of steps S2, S4, S8, S10, S14, S17, S30, S32, S34, S38, S40, S42, S60 and S20. In step S42, the MPU 54b outputs an upshift demand $CS_U$. Subsequently, the MPU 54b repeats execution of jobs along steps S2, S4, S8, S10, S14, S17, S30, S32, S34, S38, S60 and S20 until the up SW signal Se changes to "OFF" level due to disappearance of the operator upshift demand. Upon or immediately after this change of the up SW signal Se from "ON" to "OFF" level, the MPU 54b executes jobs along steps S2, S4, S8, S10, S14, S17, S30, S32, S34, S36, S60, S62, S64, S68 and S20. In step S36, the MPU 54b sets the flag Fc equal to one (1) and loads the counter CNT1 with the predetermined value $CNT1_{max}$. Subsequently after the flag Fc has been set equal to one (1), the MPU 54b repeats execution of jobs along steps S2, S4, S8, S10, S14, S17, S30, S32, S44, S46, S50, S60, S62, S64, S68 and S20. This repetition continues until the counter CNT1 will become equal to or less than zero (0). Immediately after determination, in step S46, that the content of counter CNT1 is equal to or less than zero (0), the MPU 54b resets the flag Fc in step S48. Subsequently after the flag Fc has been reset, the MPU 54b repeats execution of jobs along steps S2, S4, S8, S10, S14, S17, S30, S32, S34, S38, S60, S62, S64, S68 and S20 until moment $T_6$.

Referring to FIG. 8, at moment $T_6$, the operator moves the second up-down select switch 44 to the downshift "−" to indicate an operator downshift demand. This causes a change in level of the down SW signal Sc from "OFF" to "ON" level. Upon or immediately after moment $T_6$, the MPU 54b executes jobs along steps S2, S4, S8, S10, S14, S17, S30, S60, S62, S64, S68, S70, S72 and S20. In step S72, the MPU 54b outputs a downshift demand $CS_D$. Subsequently, the MPU 54b repeats execution of jobs along steps S2, S4, S8, S10, S14, S17, S30, S60, S62, S64, S68 and S20 until the down SW signal Sc changes from "ON" to "OFF" level due to disappearance of the operator downshift demand. Upon or immediately after this change of the down SW signal Sc from "ON" to "OFF" level, the MPU 54b executes jobs along steps S2, S4, S8, S10, S14, S17, S30, S32, S34, S38, S60, S62, S64, S66 and S20. In step S66, the MPU 54b sets the flag Fd equal to one (1) and loads the counter CNT2 with the predetermined value $CNT2_{max}$. Subsequently after the flag Fd has been set equal to one (1), the MPU 54b repeats execution of jobs along steps S2, S4, S8, S10, S14, S17, S30, S32, S34, S38, S60, S62, S74, S76, S80 and S20. This repetition continues until the counter CNT2 will become equal to or less than zero (0). Immediately after determination, in step S76, that the content of counter CNT2 is equal to or less than zero (0), the MPU 54b resets the flag Fd in step S78. Subsequently after the flag Fd has been reset, the MPU 54b repeats execution of jobs along steps S2, S4, S8, S10, S14, S17, S30, S32, S34, S38, S60, S62, S64, S68 and S20.

Let us consider the case where the select lever 2 is in the automatic shift path 4. This causes the not manual mode signal Sa to take "ON" level. Under this condition, the routine proceeds along steps S2, S4 and S8 to step S6. In step S6, the MPU 54b performs the automatic ratio control routine.

Referring to FIG. 9, let us now consider the case where the operator keeps on pressing the first up-down select switch 42 to the upshift "+" to indicate an operator upshift demand over a period of time $T_{10}$–$T_{12}$. Under this condition, it is assumed that, at moment $T_{11}$, the select lever 2 is manipulated to the upshift "+", moving the movable contact 32a from the second stationary contact 32c to the first stationary contact 32b, thus indicating another operator upshift demand. During this transient period, the up SW signal Se drops down to "OFF" level temporarily. As readily seen from FIG. 1, the time period during which the up SW signal Se stays temporarily at "OFF" level is determined by time taken by the movable contact 34a to move from the second stationary contact 32c to the first stationary contact 32b.

Change in level of the up SW signal Se from "OFF" level to "ON" level after the temporary "OFF" level during the transient period will not cause the MPU 54b to generate any upshift demand $CS_U$. This will be confirmed by brief inspection of FIG. 5. In FIG. 5, the change from "ON" to "OFF" level that occurs at moment $T_{11}$ causes the routine to proceed from step S34 to step S36. In step S36, the MPU 54b sets the flag Fc equal to one (1) and loads the counter CNT1 with the predetermined value $CNT1_{max}$. Subsequently, the MPU 54b repeats execution along a decrement flow. The decrement flow includes steps S32, S44, S46 and S50. The routine can escape from this decrement flow upon or immediately after the occurrence of the subsequent change of the up SW signal Se from "OFF" to "ON" level. This means that occurrence of a change of the up SW signal Se from "OFF" to "ON" level within a time frame after occurrence of a change from "ON" to "OFF" level will not cause the MPU 54b to output any upshift demand $CS_U$. The time frame begins with the moment when the flag Fc is set and ends with the moment when the content of the counter CNT1 becomes equal to or less than zero (0).

Next, let us consider the case where the operator keeps on pressing the second up-down select switch 44 to the downshift "–" to indicate an operator downshift demand over a period of time $T_{13}$–$T_{15}$. Under this condition, it is assumed that, at moment $T_{14}$, the select lever 2 is manipulated to the downshift "–", moving the movable contact 34a from the second stationary contact 34c to the first stationary contact 34b, thus indicating another operator downshift demand. During this transient period, the down SW signal Sc drops down to "OFF" level temporarily.

Change in level of the down SW signal Sc from "OFF" level to "ON" level after the temporary "OFF" level during the transient period will not cause the MPU 54b to generate any downshift demand $CS_D$. This will be confirmed by brief inspection of FIG. 6. In FIG. 6, the change of the down SW signal Sc from "ON" to "OFF" level that occurs at moment $T_{14}$ causes the routine to proceed from step S64 to step S66. In step S66, the MPU 54b sets the flag Fd equal to one (1) and it also sets the counter CNT2 equal to $CNT2_{max}$. Subsequently, the MPU 54b repeats execution along a decrement flow. The decrement flow includes steps S62, S74, S76 and S80. The routine can escape from this decrement flow upon or immediately after the occurrence of change of the down SW signal Sc from "OFF" to "ON" level. This means that occurrence of a change from "OFF" to "ON" level within a time frame after occurrence of a change from "ON" to "OFF" level will not cause the MPU 54b to output any downshift demand $CS_D$. The time frame begins with the moment when the flag Fd is set and ends with the moment when the content of the counter CNT2 becomes equal to or less than zero (0).

Let us consider the case where, during time period $T_{16}$–$T_{18}$, the operator selects the upshift "+" through the first up-down select switch 42 to indicate an operator upshift demand and at the same time selects downshift "–" through the second up-down select switch 44 to indicate an operator downshift demand. In this case, the up and down SW signals Se and Sc are at "ON" levels, respectively, over the time period $T_{16}$–$T_{18}$. Upon or immediately after initiation of concurrent occurrence of up and down SW signals Se and Sc, each having "ON" level, the interrogation at step S14 in FIG. 4 results in affirmative, causing the MPU 54b to perform a warning routine as illustrated in FIG. 7 in step S16.

The MPU 54b performs decrement of the counter CNT3 from $CNT3_{max}$ by repeating execution of steps S92 and S98. Subsequently when the content of the counter CNT3 becomes equal to or less than zero (0), the routine proceeds to step S94 and then to step S96. In step S94, the MPU 54b outputs a first kind of warning signal $CS_{W1}$. In step S96, the MPU 54b sets the flag Fe equal to one (1) and loads the counter CNT3 with the predetermined value $CNT3_{max}$. In response to this first kind of warning signal $CS_{W1}$, the display device 58 visually presents warning message that "Concurrent application of up and down SW signals Se and Sc or invalid operator manipulation of the up-down select switches has occurred." This first kind of warning signal $CS_{W1}$ and the corresponding message disappear if the operator stops this unusual operation of the up-down select switches 42 and 44. After outputting the first kind of warning signal $CS_{W1}$ in step S94, the routine proceeds along steps S90, S104 and S106 to perform decrement of the counter CNT3 from $CNT3_{max}$. If, in step S104, the counter CNT3 becomes equal to or less than zero (0), the MPU 54b outputs a second kind of warning signal $CS_{W2}$ in step S100 and sets the flag Fa equal to one (1) in step S102. In response to this second kind of warning signal $CS_{W2}$, the display device 58 visually presents a message that "Circuit failure has occurred or the invalid operator manipulation still continues." Immediately after the flag Fa has been set in step S102, the routine proceeds from step S4 to step S6 (see FIG. 4), initiating operation in automatic ratio change mode.

The concurrent occurrence of "ON" level up and down SW signals Se and Sc may take place due to failure in the circuit. This abnormal signal behavior will not disappear even if the operator holds each of the up-down select switches 42 and 44 away from the upshift and downshift "+" and "–". In this case, the MPU 54b starts decrement of the counter CNT3 (at moment $T_{19}$) and sets the flag Fa equal to one (1) upon completion by the MPU 54b of decrement of the counter CNT3 from $CNT3_{max}$ two times. Immediately after the flag Fa has been set, a shift is made to operation in automatic ratio change mode.

From the preceding description, it is now understood that the software included by control unit 50 generates an upshift demand $CS_U$ in response to a change in up SW signal Se from "OFF" level to "ON" level when the down SW signal Sc is at "OFF" level. It also generates a downshift demand $CS_D$ in response to a change in the down SW signal Sc from "OFF" level to "ON" level when the up signal Se is at "OFF" level.

According to the circuit of FIG. 1, the up/down SW signal Se or Sc may be subject to a temporal drop to "OFF" level due to manipulation of the select lever 2 in the presence of an operator shift demand through the up-down select switch 42 or 44. Brief review of description on the time periods $T_{10}$ to $T_{15}$ along upshift and downshift command generating routines clarifies that the software controls generation of an upshift or downshift command even if there occur multiple application of two operator upshift or downshift demands.

From the description on the warning routine, it is appreciated that concurrent presence of an operator upshift demand and an operator downshift demand prevents generation of any shift demand. The software makes a shift to operation in automatic ratio change mode if this concurrent occurrence of two operator shift demands continues over the predetermined time.

Figure 10:
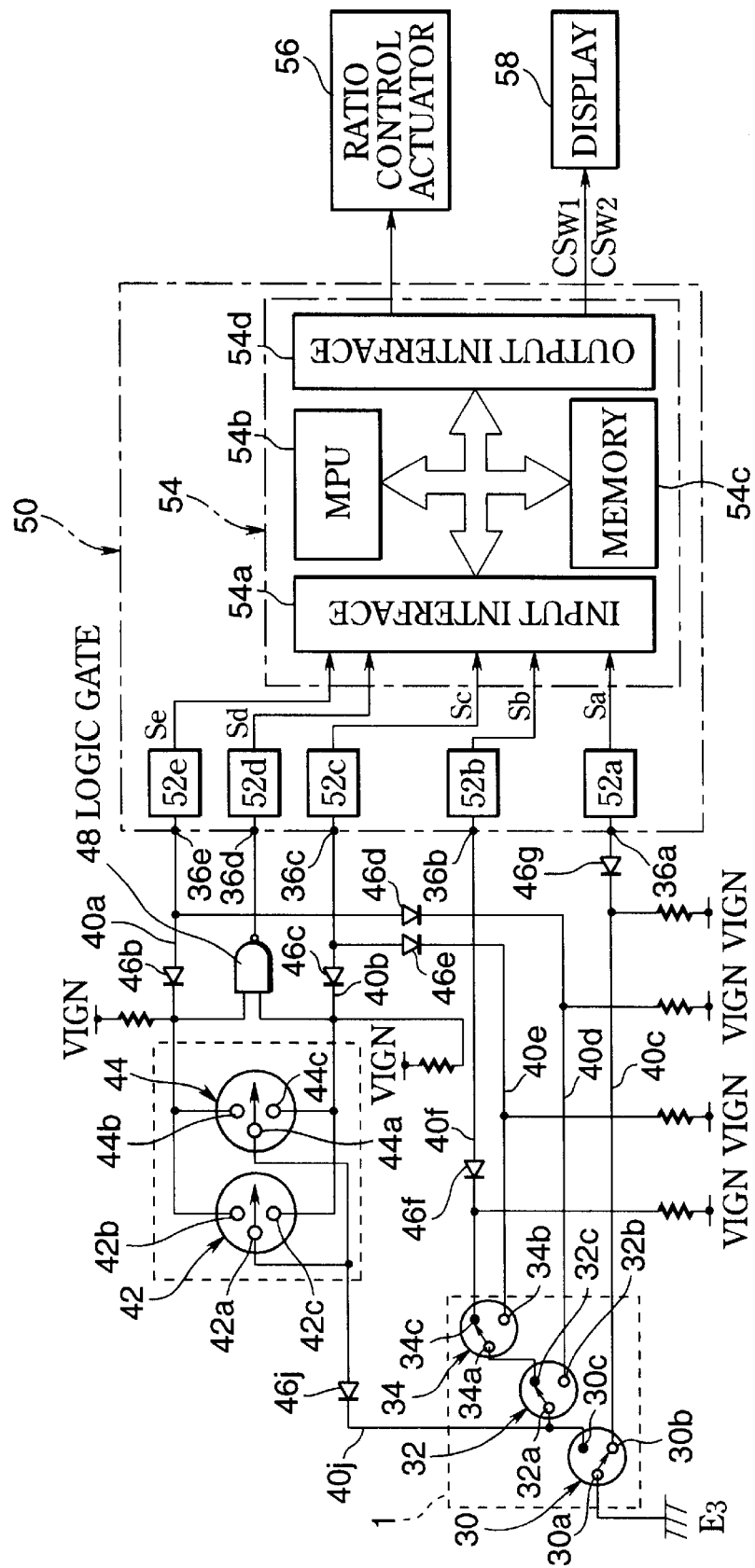
FIG. 10 is a circuit diagram similar to FIG. 1 incorporating a modification.

FIG. 10 illustrates a second embodiment that is a modification of the preferred implementation as illustrated in FIG. 1 according to the present invention.

Figure 11:
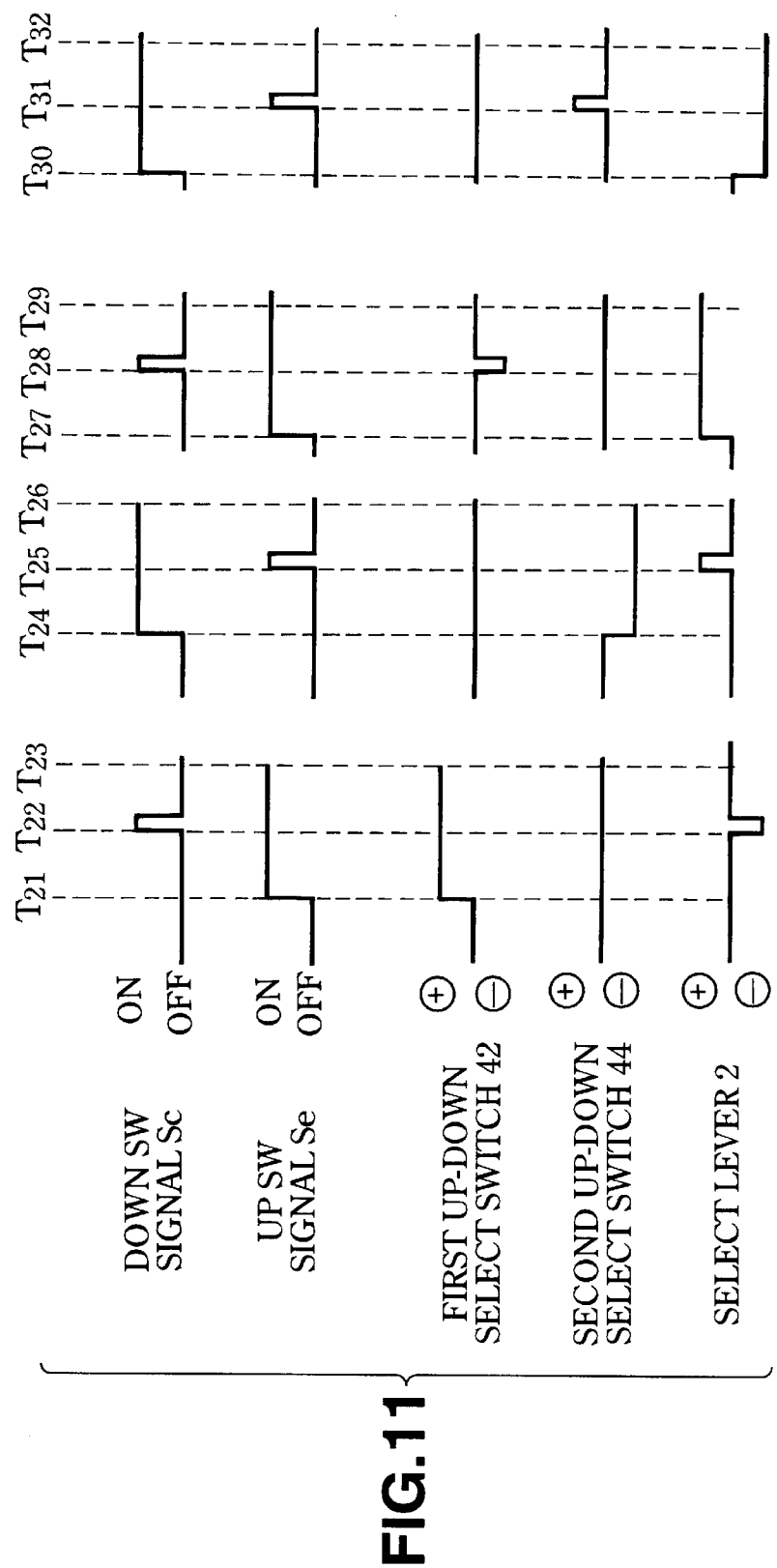
FIG. 11 illustrates variation of an up SW signal and a down SW signal, which occur within the circuit shown in FIG. 10, in response to operator shift demands through concurrent manipulation of a first up-down select switch, a second up-down select switch and a select lever.

This embodiment is substantially the same as that illustrated in FIG. 1 except the connection of movable contacts 42a and 44a of the first and second up-down select switches 42 and 44. In FIG. 1, these movable contacts 42a and 44a are connected via the line 40g and the diode 46a to the stationary contact 34c of the downshift switch 34 of the range selector 1. According to this circuit arrangement, the select lever 2 has to stay in the manual shift path 6 away from the upshift and downshift "+" and "−" before the operator can manipulate the first or second up-down select switch 42 or 44 to indicate an operator upshift/downshift demand. In FIG. 10, the movable contacts 42a and 44a are connected via a signal line 40j and a diode 46j to a stationary contact of the manual mode switch 30. According to this parallel arrangement, operator upshift and downshift demands that are indicated by manipulating separately any two of the first and second up-down switches 42 and 44 and select lever 2 are represented by "ON" level up and down SW signals Se and Sc as illustrated in FIG. 11. However, concurrent generation of operator upshift and downshift demands will not result in outputting of two upshift and downshift demands. This is because the software will not output an upshift demand $CS_U$ in response to a change of up SW signal Se from "OFF" to "ON" level in the presence of "ON" level down SW signal Sc. This may be confirmed from brief inspection of steps S38, S40 and S42 in the flow chart of FIG. 5. The software will not output a downshift demand $CS_D$ in response to a change of down SW signal Sc from "OFF" to "ON" level in the presence of "ON" level up SW signal Se. This may be confirmed from brief inspection of steps S68, S70 and S72.

FIG. 11 illustrates four cases.

According to the first case, a change in up SW signal Se from "OFF" to "ON" level occurs at moment $T_{21}$ in response to an operator upshift demand through the first up-down select switch 42 and the software outputs an upshift demand $CS_U$ immediately after moment $T_{21}$. The up SW signal Se stays at "ON" level without interruption as long as the operator upshift demand is present. At moment $T_{22}$, the down SW signal Sc is subject to a change from "OFF" to "ON" level in response to an operator downshift demand through the select lever 2. The change in down SW signal Sc will not result in generation of a downshift demand $CS_D$ because the up SW signal Se stays at "ON" level.

According to the second case, a change in down SW signal Sc from "OFF" to "ON" level occurs at moment $T_{24}$ in response to an operator downshift demand through the second up-down select switch 44 and the software outputs a downshift demand $CS_D$ immediately after moment $T_{24}$. The down SW signal Sc stays at "ON" level without interruption as long as the operator downshift demand is present. At moment $T_{25}$, the up SW signal Se is subject to a change from "OFF" to "ON" level in response to an operator upshift demand through the select lever 2. The change in up SW signal Se will not result in generation of an upshift demand $CS_U$ because the down SW signal Sc stays at "ON" level.

According to the third case, a change in up SW signal Se from "OFF" to "ON" level occurs at moment $T_{27}$ in response to an operator upshift demand through the select lever 2 and the software outputs an upshift demand $CS_U$ immediately after moment $T_{27}$. The up SW signal Se stays at "ON" level without interruption as long as the operator upshift demand is present.

At moment $T_{28}$, the down SW signal Sc is subject to a change from "OFF" to "ON" level in response to an operator downshift demand through the first up-down select switch 42. The change in down SW signal Sc will not result in generation of a downshift demand $CS_D$ because the up SW signal Se stays at "ON" level.

According to the fourth case, a change in down SW signal Sc from "OFF" to "ON" level occurs at moment $T_{30}$ in response to an operator downshift demand through the select lever 2 and the software outputs a downshift demand $CS_D$ immediately after moment $T_{30}$. The down SW signal Sc stays at "ON" level without interruption as long as the operator downshift demand is present. At moment $T_{31}$, the up SW signal Se is subject to a change from "OFF" to "ON" level in response to an operator upshift demand through the second up-down select switch 44. The change in up SW signal Se will not result in generation of an upshift demand $CS_U$ because the down SW signal Sc stays at "ON" level.

The content of disclosure of Japanese Patent Application No. 10-97716 (filed Apr. 9, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. A shift device for an automatic transmission, which is operable in a manual ratio change mode, of a vehicle, comprising:

a range selector having a select lever manually operable for selection between the automatic ratio change mode and the manual ratio change mode and for selection between an upshift and a downshift in the manual ratio change mode;

an upshift switch and a downshift switch, which are mounted to said range selector, said upshift switch being operative, in response to selection of the upshift by said select lever, to indicate an operator upshift demand, said downshift switch being operative, in response to selection of the downshift by said select lever, to indicate an operator downshift demand;

an up-down select switch manually operable to select an upshift and a downshift, said up-down select switch being operative, in response to selection of the upshift by manual operation of said up-down select switch, to indicate an operator upshift demand, said up-down select switch being operative, in response to selection of the downshift by manual operation of said up-down select switch, to indicate an operator downshift demand, a control unit having an operator upshift demand input terminal and an operator downshift demand input terminal, said operator upshift demand input terminal being connected to said upshift switch and said up-down select switch, in parallel, said operator downshift demand input terminal being connected to said downshift switch and said up-down select switch, in parallel, said control unit being operative to generate a two-level up signal, said two-level up signal having a first level indicative of absence of an operator upshift demand on said operator upshift demand input terminal and a second level indicative of presence of an operator upshift demand on said operator upshift demand input terminal, said control unit being operative to generate a two-level down signal, said two-level down signal having a first level in indicative of absence of an operator downshift demand on said operator downshift demand input terminal and a second level indicative of presence of an operator downshift demand on said operator downshift demand input terminal, said control unit including a software to generate an upshift demand in response to a change in said two-level up signal from the first level thereof to the second level thereof when said two-level down signal is at the first level thereof and to generate a downshift demand in response to a change in said two-level down signal from the first level thereof to the second level thereof when said two-level up signal is at the first level thereof.

2. The shift device as claimed in claim 1, wherein said upshift and downshift switches form a part of a ground connection between said up-down select switch and a ground when said upshift and downshift switches indicate no operator upshift and downshift demands, respectively.

3. The shift device as claimed in claim 2, further comprising a manual mode switch that forms a part of said ground connection when said select lever is in a position selecting the manual ratio change mode.

4. The shift device as claimed in claim 2, wherein said software prevents generation of the upshift demand if a current change in the up signal from the first level thereof to the second level thereof occurs within a predetermined period of time after occurrence of the adjacent preceding change in the up signal from the second level thereof to the first level thereof, and wherein said software prevents generation of the downshift demand if a current change in the down signal from the first level thereof to the second level thereof occurs within a predetermined period of time after occurrence of the adjacent preceding change in the down signal from the second level to the first level thereof.

5. The shift device as claimed in claim 1, further comprising a manual mode switch that forms a common ground connection between said up-down select switch and a ground and between said upshift and downshift switches and the ground when said select lever is in a position selecting the manual ratio change mode.

6. The shift device as claimed in claim 5, wherein said software prevents generation of the upshift demand if the up signal stays at the second level thereof temporally within a predetermined period of time when the down signal is at the second level thereof, and wherein said software prevents generation of the downshift demand if the down signal stays at the second level thereof temporally within said predetermined period of time when the up signal is at the second level thereof.

7. The shift device as claimed in claim 1, wherein said software prevents generation of any one of the upshift and downshift demand and generates a first kind of warning signal after the up and down signals have continuously stayed at the second levels thereof over a first predetermined period of time.

8. The shift device as claimed in claim 7, further comprising a device that is operative in response to said first kind of warning signal to notify an operator abnormal treatment of said select lever and said up-down select switch.

9. The shift device as claimed in claim 7, wherein said software generates a second kind of warning signal after the up and down signals have continuously stayed at the second levels thereof over a predetermined period of time after generation of said first kind of warning signal.

10. The shift device as claimed in claim 9, wherein said software forces the automatic transmission to operate in the automatic ratio change mode after generation of said second kind of warning signal.

* * * * *